United States Patent Office 3,223,733
Patented Dec. 14, 1965

3,223,733
O-CARBAMOYL-SUBSTITUTED ACYLCHLORIDE OXIME
Rudolf Heiss, Cologne-Stammheim, Gerhard Burmeister, Cologne-Muhlheim, and Ferdinand Grewe, Cologne-Stammheim, Germany, assignors to Farbenfabriken Bayer Aktiengesellschaft, Leverkusen, Germany, a German corporation
No Drawing. Filed Aug. 14, 1962, Ser. No. 216,718
Claims priority, application Germany, Sept. 1, 1961, F 34,832
6 Claims. (Cl. 260—566)

The present invention relates to and has as its objects new and useful fungicidal carbamic acid esters of the general formula

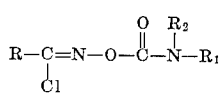

in which R and $R_1$ stand for optionally substituted aliphatic, cycloaliphatic, araliphatic or aromatic radicals, whilst $R_2$ means hydrogen or an alkyl radical, and processes for their preparation.

As substituents of the above radicals R and $R_1$ there may be considered especially halogen atoms, alkoxy, alkylmercapto, amino, alkyl, or dialkyl amino or nitro radicals.

R is a radical of the group consisting of lower alkyl radicals containing up to 4 carbon atoms, chloro-substituted lower alkyl radicals containing up to 4 carbon atoms, phenyl and substituted phenyl, the substituents of said substituted phenyl being up to 2 in number and of the group consisting of chloro, nitro and methoxy, $R_1$ is a radical of the group consisting of lower alkyl radicals containing up to 4 carbon atoms and phenyl and substituted phenyl, the substituents of said substituted phenyl being up to 2 in number and of the group consisting of lower alkyl, chloro, nitro and lower alkoxy and $R_2$ is a radical of the group consisting of hydrogen and lower alkyl radicals containing up to 4 carbon atoms.

In accordance with this invention the production of these carbamic acid esters having the above general formula may be carried out by methods known in principle, e.g. either by reaction of the corresponding aliphatic, cycloaliphatic, araliphatic or aromatic hydroxamic acid chlorides with isocyanates or carbamic acid chlorides, or by phosgenation of the hydroxamic acid chlorides mentioned and reaction of the resulting chloroformic or biscarbonic acid esters with primary or secondary amines.

The hydroxamic acid chlorides required as starting materials for the process according to the invention can be obtained in the manner known as such from the corresponding aldehydes and hydroxylamine and subsequent chlorination of the hydroxamic acids formed.

As stated above the compounds obtainable according to the present invention possess an excellent fungicidal action. Hitherto only thio- or dithiocarbamic acid derivatives were known to exhibit these properties. This action covers a great number of phytopathogenic fungi, of which without limiting the combatable fungi of plant diseases thereto, the following shall be particularly mentioned:

Venturia inaequalis (Fusicladium dendriticum)
Alternaria solani
Phytophthora infestans
Plasmopara viticola As an example for these surprising, technically valuable properties of the products according to this invention there may serve the fungicidal action of the O-(N-methylcarbamoyl)-benzoyl chloride oxime (which could also be called O-(N-methylcarbamoyl)hydroxyimino(alpha-chloromethyl)benzene) having the formula

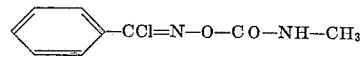

when used against the fungi Phytophthora infestans, Alternaria solani and Plasmopara viticola.

(1) TESTING PHYTOPHTHORA INFESTANS

Young potted tomato plants of the Bonny Best variety with 4 to 5 foliage leaves are sprayed with aqueous emulsions or suspensions of the preparation at concentrations of the active substance indicated below. 24 hours after spraying, the plants are inoculated with zoo spores of the fungus Phytophthora infestans and subsequently incubated at 100% relative atmospheric moisture and a temperature of 18 to 20° C. After 5 days, the infection of each pinnate leaf of the plants treated in the manner described above is determined and expressed in % of the infection of the untreated control plant the infection degree of which is 100.

The results obtained are compiled in Table 1:

TABLE 1.—FUNGICIDAL ACTION AGAINST PHYTOPHTHORA INFESTANS ON TOMATOES

| Preparation | Infection degree in percent of the untreated control at a concentration of preparation of— | | | |
|---|---|---|---|---|
| | 0.1% | 0.025% | 0.00625% | 0.003125% |
| ⌬—C=NO—C—NHCH₃ (Cl, O) | 0 | 5 | 28 | 34 |
| Untreated control | 100 | | | |

(2) TESTING ALTERNARIA SOLANI ON TOMATOES

The test takes place in principle in the same manner as that with Phytophthora infestans, but the incubation is carried out at a temperature of 23 to 25° C. and the evaluation of the test takes place already 3 days after inoculation with spores of Alternaria solani.

The test results can be seen from Table 2:

TABLE 2.—FUNGICIDAL ACTION AGAINST ALTERNARIA SOLANI ON TOMATOES

| Preparation | Infection degree in percent of the untreated control at a concentration of preparation of 0.00625% |
|---|---|
| ![structure]  C₆H₅-C(Cl)=N-O-C(=O)-NHCH₃ | 39 |
| Untreated control test | 100 |

(3) TESTING *PLASMOPARA VITICOLA* ON VINES

Young potted vines of the Müller-Thurgau variety with 5 to 7 developed leaves are sprayed in the manner indicated above. After the spray liquor has dried, inoculation with a zoo sporangium suspension of the fungus *Plasmopara viticola* is carried out. The subsequent incubation takes place at 20 to 23° C. in air saturated with moisture. The evaluation of the test is carried out after 6 days, the degree of infestation being determined in the same manner as described under 1.

Table 3 gives a summary of the results obtained:

TABLE 3.—FUNGICIDAL ACTION AGAINST *PLASMOPARA VITICOLA* ON VINES

| Preparation | Infection degree in percent of the untreated control at a concentration of preparation of— | |
|---|---|---|
| | 0.0125% | 0.003125% |
| C₆H₅-C(Cl)=N-O-C(=O)-NHCH₃ | 0 | 8 |
| Untreated control test | 100 | |

The compounds according to the invention are distinguished by a remarkable plant tolerance. Young tomato plants are not damaged by spraying with 0.3% solutions of O-(N-methylcarbamoyl)benzoyl chloride oxime.

Carbamic acid esters, obtainable according to the process of the invention as fungicides, can be used in the presence of suitable solvents and emulsifiers in the form of aqueous emulsions. It is, however, also possible to mix the inventive agents together with suitable auxiliary suspending agents and inert carriers, such as kaolin, bentonite or similar substances, and to employ them as aqueous suspensions. Finally, the preparations may also be applied to the plants to be protected in the form of dusting agents after mixing and optionally grinding with suitable solid carrier materials. The combined use of the compounds according to the invention with other fungicides and/or insecticides is possible.

The following examples are given for the purpose of illustrating the process claimed:

Example 1

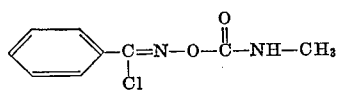

A solution of 46.7 g. (0.3 mol) of benzoyl chloride oxime ($C_6H_5C(Cl)=NOH$) in 18.8 g. (0.33 mol) of methyl isocyanate ($CH_3-N=CO$) is treated with 3 drops of triethylamine. After standing for 24 hours, the O-(N-methylcarbamoyl)benzoyl chloride oxime thus produced crystallizes out. After recrystallization from ligroin the compound melts at 83 to 84° C.

Example 2

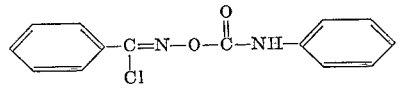

10.9 g. (0.07 mol) of benzoyl chloride oxime are suspended in 10 cc. of anhydrous benzene and this suspension is treated with 8.35 g. (0.07 mol) of phenylisocyanate and 3 drops of triethylamine. After standing of the mixture for 24 hours, the benzene is distilled off and the residue is recrystallized from ligroin. The O-(N-phenylcarbamoyl)benzoyl chloride oxamine thus produced melts at 136 to 137° C.

In an analogous manner the following carbamic acid esters having the formulae specified thereafter can be prepared:

O-(N-3-methylphenylcarbamoyl)benzoyl chloride oxime

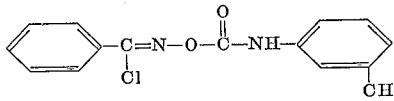

M.P. 87 to 89° C.

O-(N-2-chlorophenylcarbamoyl)benzoyl chloride oxime

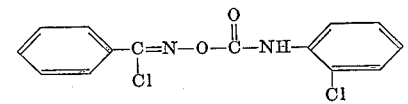

M.P. 85 to 85.5° C.

O-(N-3-chlorophenylcarbamoyl)benzoyl chloride oxime

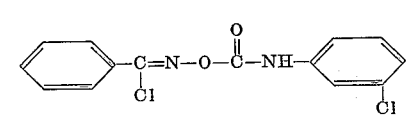

M.P. 107 to 108° C.

O-(N-4-chlorophenylcarbamoyl)benzoyl chloride oxime

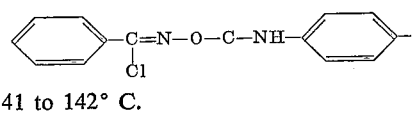

M.P. 141 to 142° C.

O-(N-3,4-dichlorophenylcarbamoyl)benzoyl chloride oxime

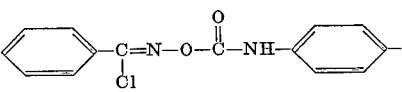

M.P. 150 to 151° C.

O-(N-4-nitrophenylcarbamoyl)benzoyl chloride oxime

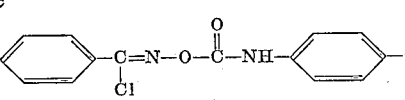

M.P. 150 to 151° C.

O-(N-4-ethoxyphenylcarbamoyl)benzoyl chloride oxime

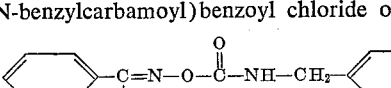

M.P. 153 to 154° C.

O-(N-benzylcarbamoyl)benzoyl chloride oxime

M.P. 88 to 90° C.

O-(N-3-nitro-4-methylphenylcarbamoyl)benzoyl chloride oxime

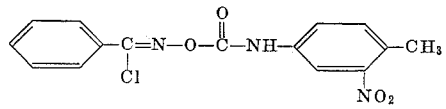

M.P. 142–143° C.

O-(N-hexadecylcarbamoyl chloride oxime

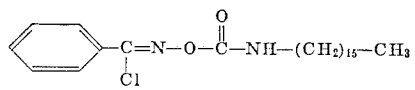

M.P. 87–88° C.

O-(N-phenylcarbamoyl)benzoyl oxime

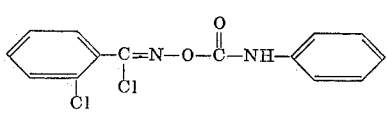

M.P. 125–126 C.

O-(N - 4 - chlorophenylcarbamoyl) - 2 - chlorobenzoyl chloride oxime

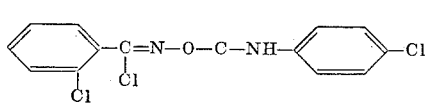

M.P. 116–117° C.

O-(N-phenylcarbamoyl)-4-chlorobenzoyl chloride oxime

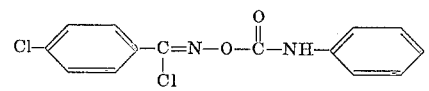

M.P. 242–243° C.

O-(N-3-chlorophenylcarbamoyl)-4-chlorobenzoyl chloride oxime

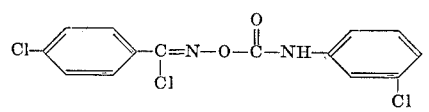

M.P. 134–135° C.

O-(N-4-chlorophenylcarbamoyl)-3-chlorobenzoyl chloride oxime

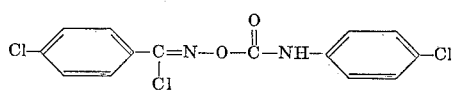

M.P. 124–125° C.

O-(N-3-chlorophenylcarbamoyl)-3-chlorobenzoyl chloride oxime

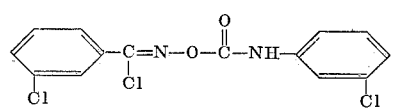

M.P. 102–103° C.

O-(N-4-chlorophenylcarbamoyl)-2-chlorobenzoyl chloride oxime

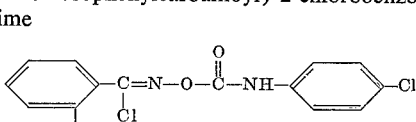

M.P. 137–138° C.

O-(N-methylcarbamoyl)-2-chlorobenzoyl chloride oxime

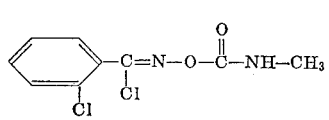

O-(N-methylcarbamoyl)-4-chlorobenzoyl chloride oxime

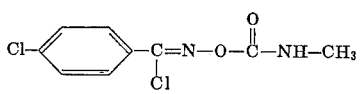

M.P. 150–151° C.

O - (N-3-methylphenylcarbamoyl)-2,6-dichlorobenzoyl chloride oxime

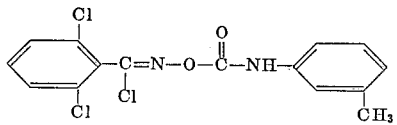

M.P. 139–140° C.

O-(N-phenylcarbamoyl)-3-nitrobenzoyl chloride oxime

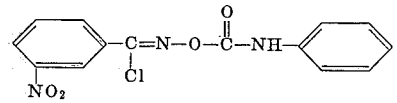

M.P. 151–152° C.

O-(N - 2-chlorophenylcarbamoyl)-4-nitrobenzoyl chloride oxime

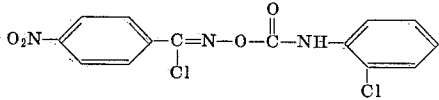

M.P. 160–161° C.

Also the compounds represented by the following formulae may be obtained in accordance with the process of the present invention:

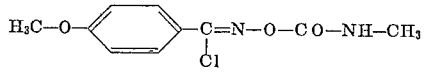

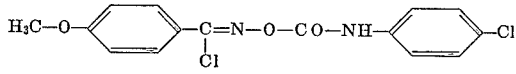

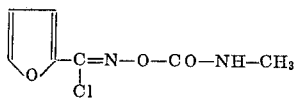

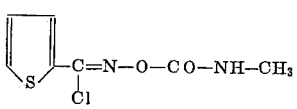

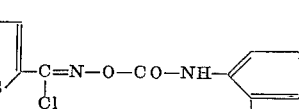

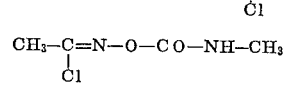

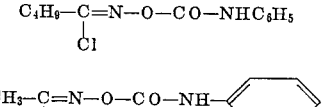

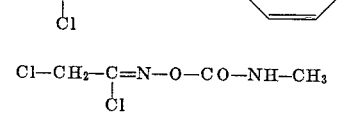

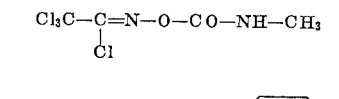

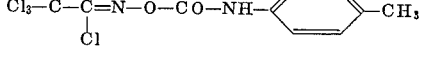

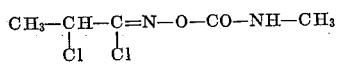

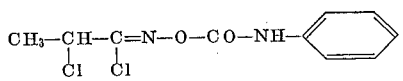

*Example 31*

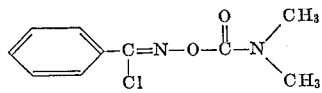

23.3 grams (0.15 mol) of benzoyl chloride oxime and 16.7 grams of dimethylcarbamic acid chloride (0.16 mol) are dissolved in 90 ml. of benzene. This solution is treated dropwise while stirring with 12.7 grams (0.16 mol) of pyridine at room temperature. Temperature of the mixture is kept for 24 hours at room temperature, whereafter the crystallized pyridine hydrochloride is separated by filtration. The benzene solution is washed with diluted hydrochloric acid, diluted sodium carbonate solution and finally with water. The solution then is dried over sodium sulfate and the benzene is distilled off in vacuum. The residue crystallizes and may be recrystallized from ether. The O-(N,N-dimethylcarbamoyl)benzoyl chloride oxime thus produced has a melting point of 60–62° C.

In an analogous manner there may also be obtained the compounds represented by the following formulae

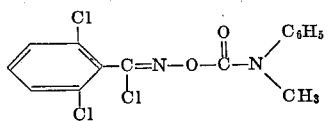

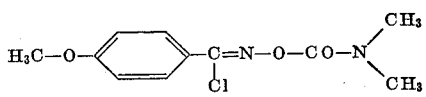

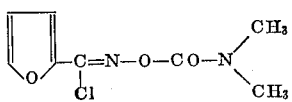

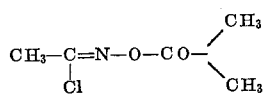

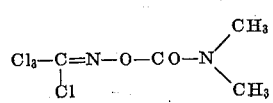

We claim:
1. An O-carbamoyl-substituted acylchloride oxime having the formula

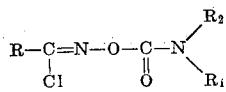

in which R is a radical of the group consisting of lower alkyl radicals containing up to 4 carbon atoms, chloro-substituted lower alkyl radicals containing up to 4 carbon atoms, phenyl and substituted phenyl, the substituents of said substituted phenyl being up to 2 in number and of the group consisting of chloro, nitro and methoxy, $R_1$ is a radical of the group consisting of lower alkyl radicals containing up to 4 carbon atoms and phenyl and substituted phenyl, the substituents of said substituted phenyl being up to 2 in number and of the group consisting of lower alkyl, chloro, nitro and lower alkoxy and $R_2$ is a radical of the group consisting of hydrogen and lower alkyl radicals containing up to 4 carbon atoms.

2. The compound of the following formula

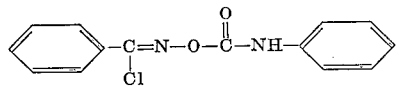

3. The compound of the following formula

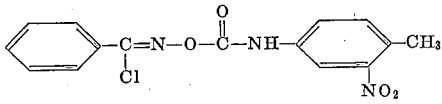

4. The compound of the following formula

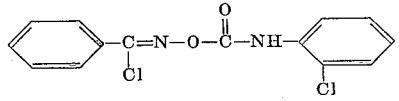

5. The compound of the following formula

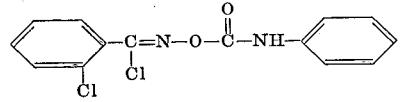

6. The compound of the following formula

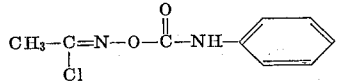

References Cited by the Examiner

Bellaveta: Gazz., chim. Ital., vol. 69, pp. 583–594 (1939).

Grammaticakis: Comptes rend., vol. 223, pp. 741–3 (1946).

Mangini: Gazz. chim. Ital., vol. 66, pp. 337–343 (1936).

CHARLES B. PARKER, *Primary Examiner.*